United States Patent [19]

Cumming

[11] 4,218,815
[45] Aug. 26, 1980

[54] MODULAR TRANSFER MACHINE

[76] Inventor: Noel N. Cumming, 732 Pierce, Birmingham, Mich. 48009

[21] Appl. No.: 943,335

[22] Filed: Sep. 18, 1978

[51] Int. Cl.³ .......................... B21B 39/00; B23Q 7/03
[52] U.S. Cl. ...................................... 29/563; 198/339; 408/70; 409/158; 409/161; 409/173
[58] Field of Search ............... 198/339, 340, 341, 342, 198/343, 344, 345, 346, 645, 648, 793, 801; 29/33 P, 563; 408/70; 409/158, 160, 161, 173

[56] References Cited

U.S. PATENT DOCUMENTS 3,447,658  6/1969  Joichi .................................. 198/345

FOREIGN PATENT DOCUMENTS 1213490  11/1970  United Kingdom ..................... 198/345

*Primary Examiner*—James L. Rowland
*Attorney, Agent, or Firm*—Krass & Young

[57] ABSTRACT

A transfer machine of the type in which workpieces are successively transferred through a series of work stations on either side of the line of movement of the workpieces with work heads located at each station to perform various operations on the workpieces. The disclosed transfer machine consists of one or more transfer machine module units, each module including a prismatic base having upwardly directed sides upon which are mounted a series of oppositely directed heads and the workpiece transfer system mounted to the base and extending between the work heads to convey the workpieces up and down the base sides. The resulting vertical spacing of the work heads from one another enables closer spacing of the work heads by enabling access to the tooling through the space through which the workpieces are transferred, while reducing the floor space required for the machine. Also, chips formed during machining operations fall away so as not to accumulate at the machining station. The modular design allows disassembly of the machine with the work heads secured to the modular bases to greatly reduce the disassembly of separate hydraulic, electrical, lube lines and reduces the number of separate bases. The transfer mechanism may transfer the workpieces through one or more successive modules.

6 Claims, 10 Drawing Figures

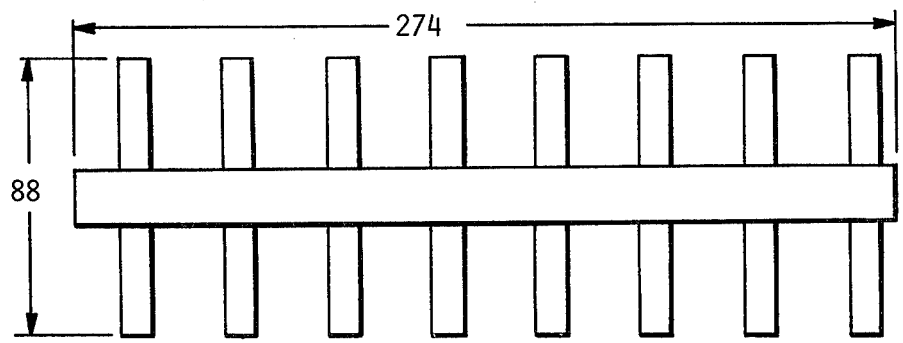
*Fig-7* PRIOR ART
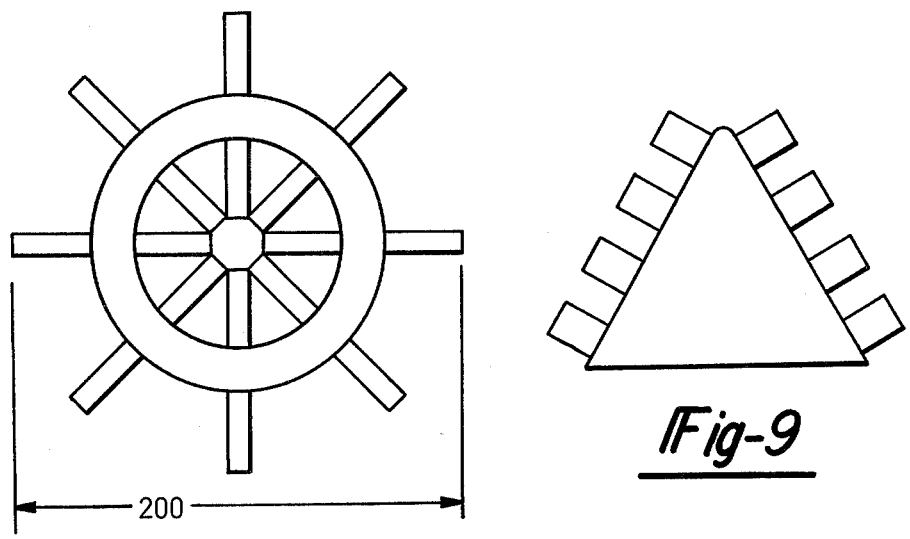
*Fig-8* PRIOR ART
*Fig-9*
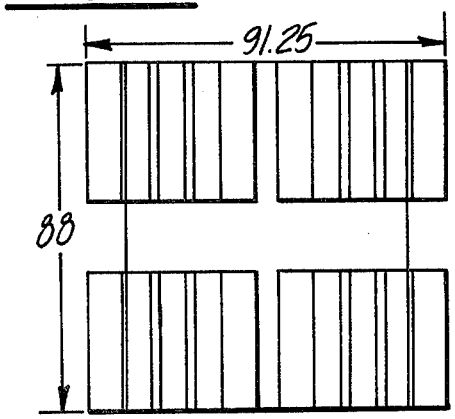
*Fig-10*

MODULAR TRANSFER MACHINE

BACKGROUND DISCUSSION

High volume production of machined parts or assemblies such as are required in the manufacture of engines, transmissions or other automotive components is commonly done by the use of transfer machines in which the workpieces are automatically moved through a series of work stations. At each station, there is performed a part of the machining or other operation required to be done on the particular workpiece, such as, drilling, milling, reaming, boring, tapping, etc. Similar machine configurations are utilized in the assembling, testing and gaging of parts and assemblies.

While such transfer machines may take many configurations, the most common form is the so-called in-line transfer machine in which the workpieces are transferred linearly through a series of work stations. The workpiece is either directly engaged by a transfer system or supported on a pallet, in turn supported by a transfer system extending between the work stations. Each work station includes one or more work heads, each mounted on a base separate from each other and from the bases supporting the transfer system.

The conventional arrangement is one in which the work stations are spaced apart in a horizontal plane. Relatively complex workpieces requiring numerous machining operations, such as transmission housings, manifolds, etc., require considerable floor space for such machines due to the large number of work stations required.

The spacing between work stations is largely determined by the need for physical access to enable tooling adjustments and replacements and the performance of maintenance functions. Thus, a substantial proportion of the floor space of the machine is a result of the need for such access space to the machine.

In recent years, the sharply increased expense of construction and maintenance of factory buildings has rendered the square footage of floor space required by such machines a significant factor in the overall cost of these machines.

At the same time, the access afforded by these spaces is none-too-convenient since the operator must climb up between the heads and lean into the work station area. Thus, tool changes and adjustments are laborious and time-consuming, increasing the machine down-time and labor expenses involved in the operation of the machine.

A problem encountered in the manufacture of such machines is in the expense involved in the customary "try out" assembly of the machine in the plant of its manufacture. The accepted procedure in the manufacture and sale of this equipment is for the machine to be assembled in the plant of the machine tool builder in order to be tried out to insure that it will perform satisfactorily in production. After the machine has been operated for this purpose, it is disassembled and shipped to the production site and thence reassembled.

The configuration of such transfer machine is such that a great deal of labor is involved in their disassembly and reassembly. These machines include separate bases for each of the work heads, as well as for the various components of the transfer system, since the physical size and relationship of these components necessitates individual bases. These bases must each be carefully aligned and leveled with respect to each other. The work heads and bases must thus also be disassembled from the remainder of the machine and, since many of the hydraulic and electrical lines run from work head to work head, a relatively great number of such electrical, hydraulic and lubrication lines must be disassembled and reassembled.

Another result of the physical orientation of the various components is the necessity to remove the accumulation of machining chips from beneath the machining head at the station. Since the workpiece moves into the station in a horizontal plane and the machining head is advanced horizontally into engagement with the workpiece, chips are generated tending to build up beneath the tooling covering the workpiece and necessitating a great deal of maintenance effort to remove the chips and creating the possibility of the chips entering into the various moving parts and openings in the workpieces.

This is particularly a problem for the large parts such as are commonly incorporated in heavy construction and farm equipment in which considerable metal is removed during the course of the machining operations.

These problems also exist to some extent in the smaller single unit machines such as dial, trunnion, and "ring" transfer machines.

Accordingly, it is an object of the present invention to provide a transfer machine in which the floor space required to accommodate the machine is greatly reduced over conventionally configured in-line transfer machines, as well as single unit machines, such as dial, trunnion, or ring transfer machines.

It is also an object of the present invention to provide a transfer machine in which the tooling is readily accessible by the machine operator to reduce the time required for making tooling changes and adjustments.

It is another object of the present invention to provide a transfer machine in which the extent of disassembly required in moving the machine from one location to another is substantially reduced.

It is yet another object of the present invention to provide such a machine tool in which the accumulation of chips at the machining station is greatly reduced and the removal of chips is facilitated over conventional designs.

It is another object of the present invention to simplify and reduce in bulk the base supports required for the various components.

SUMMARY OF THE INVENTION

These and other objects of the present invention, which will become apparent upon a reading of the following specification and claims, are accomplished by a transfer machine configuration consisting of one or more machine modules, each module including a module base having work heads mounted on oppositely upwardly extending sides of the module base. The workpieces are transferred through a central region of each of the module bases, with the work heads having tooling adapted to extend into the central region to perform the various required machining or other operations on the workpiece.

The work head tooling is easily accessible from the sides of each module and are relatively closely spaced to each other such that when combined with the vertically spaced disposition of the heads, a great reduction in the horizontal floor space required for a given number of work stations is achieved.

The vertically spaced disposition of the machine heads also enables the chips to be directed by gravity away from each of the stations to the area beneath the machine modules to allow ready removal thereof.

Each machine module is adapted to be moved as a unit to eliminate the necessity for disassembly of the individual work heads or the interconnecting electrical and hydraulic lines.

The module base provides a common base support for a number of work heads, as well as the transfer system components, further reducing the disassembly and reassembly labor, as well as reducing the total weight of the required bases over conventional designs.

Two or more of the machine modules may be arranged in series by use of a conveyor transfer system moving workpieces through the central region of each base and thence to a subsequent machine module unit.

The transfer system may consist of a chain conveyor passing below the floor level between the successive machine modules and having a return loop passing beneath each of the module bases. The transfer system may also include a palletized support for the workpiece in which case a pallet return system is provided.

DESCRIPTION OF THE DRAWINGS

FIGS. 7 and 8 are diagrammatic layout representations of prior art transfer machines of a size corresponding to a single machine according to the present invention.

FIGS. 9 and 10 are diagrammatic layout representations of a single machine module according to the present invention.

DETAILED DESCRIPTION

In the following detailed description, certain specific terminology will be utilized for the sake of clarity and a particular embodiment described in accordance with the requirements of 35 USC 112, but it is to be understood that the same is not intended to be limiting and should not be so construed inasmuch as the invention is capable of taking many forms and variations within the scope of the appended claims.

According to the concept of the present invention, the arrangement of a series of work stations is provided on each machine module, with the work stations spaced from each other along vertically extending directions on either side of the module base. The transfer movement of the workpieces is through the work stations between opposed work heads located at each work station.

The machine module base units consist of prismatically-shaped housings, each having sloping opposite vertically-extending sidewalls with the series of the work heads spaced along each of the sides with the workpieces conveyed through a central region of each of the machine modules.

A module series consisting of two or more of such machine module units may be provided as needed to carry out the complete operation required, with the workpieces being transferred from module unit to module unit as a part of the common transfer system.

Figure 1:
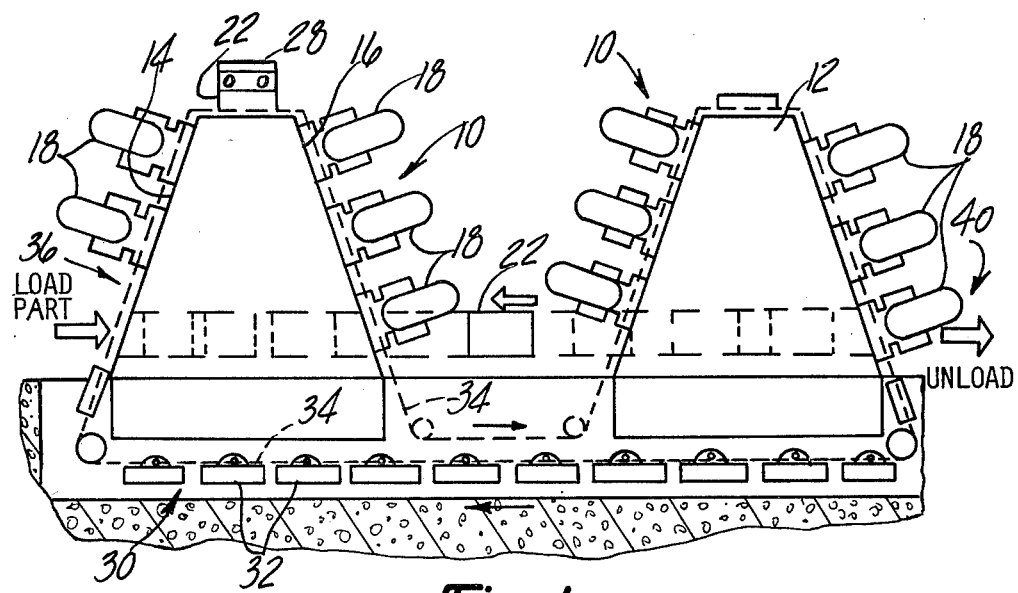
FIG. 1 is a diagrammatic representation of a side elevational view of the transfer machine according to the present invention.
Figure 2:
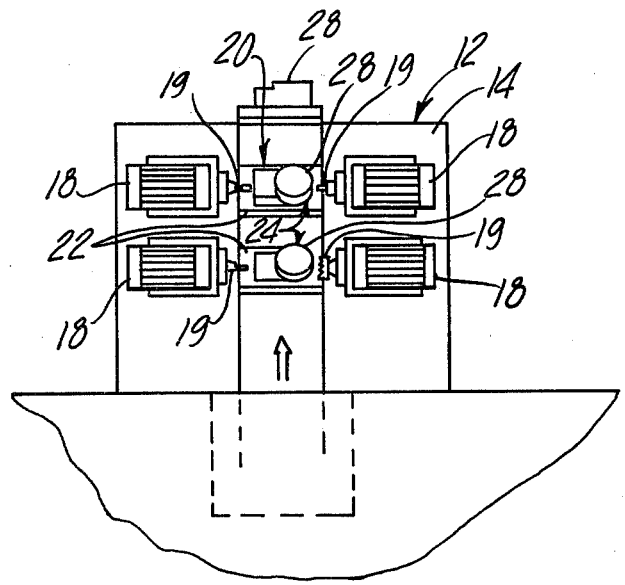
FIG. 2 is a diagrammatic representation of a front elevational view of the transfer machine shown in FIG. 1.

This arrangement is depicted in FIG. 1 which shows a transfer machine having a pair of the machine module units 10 pictured arranged in series. Each module 10 includes a trapezoidal prismatic base housing 12 having opposite sloping sides 14 and 16 with a series of oppositely directed work heads 18 mounted thereon, extending horizontally toward the central region 20 and each other.

The trapezoidal-in-section shape of the base housings 12, i.e., tapering towards the top, affords efficient use of the material in the base housings 12 to provide the necessary structural rigidity. This particular configuration is not essential to the practice of the invention so long as work heads 18 are located to be spaced essentially vertically from each other.

Work heads 18 are spaced relatively closely together compared to conventional designs, since access to the tooling 19 may be via the space above the central region 20. This is a result of the disposition of the work heads 18 in generally vertically extending planes defined by the sloping sides 14 and 16 of the base housings 12.

This arrangement also greatly enhances the ease with which tooling changes and adjustments may be made.

A transfer system is arranged to transfer workpieces through the central region 20 intermediate the work heads 18 in each work station 24. The workpieces 28 may be mounted on pallets 22 in turn carried by a chain conveyor system moving the pallets 22 through each work station 24.

The transfer system may take the form of chain conveyor 30 having plates 32 carried by conveyor chains 34 which pass through and around each central region 20 and thence below the floor level when passing between modules 10 and recirculated beneath the base units back to a return point.

The excavated space 42 provided intermediate each of the modules 10 allows the necessary clearance for transport of the pallets 22 and workpieces 28 between the modules 10 as indicated in FIG. 1. Sprockets 44, located in excavated space 42, receive the conveyor chain 34, guiding the movement of the conveyor through the space 42. This arrangements allows the floor level to be clear in between modules 10 for access to the tooling 19 of the work heads 18. The lowermost region of the unloaded conveyor 30 passes beneath modules 10 in the intermediate central region between the foundation structures 46 provided for each of the modules 10.

The pallets 22 may be adapted to be automatically power-wrenched to chain conveyor plates 32 and the workpieces 28 then power-wrenched to the pallets 22. A suitable pallet-return system (not shown) returns the pallets 22 to the load station 36 after reaching the unload station 40 whereat the parts are unloaded after passing through the entire series of work stations 24.

Figure 3:
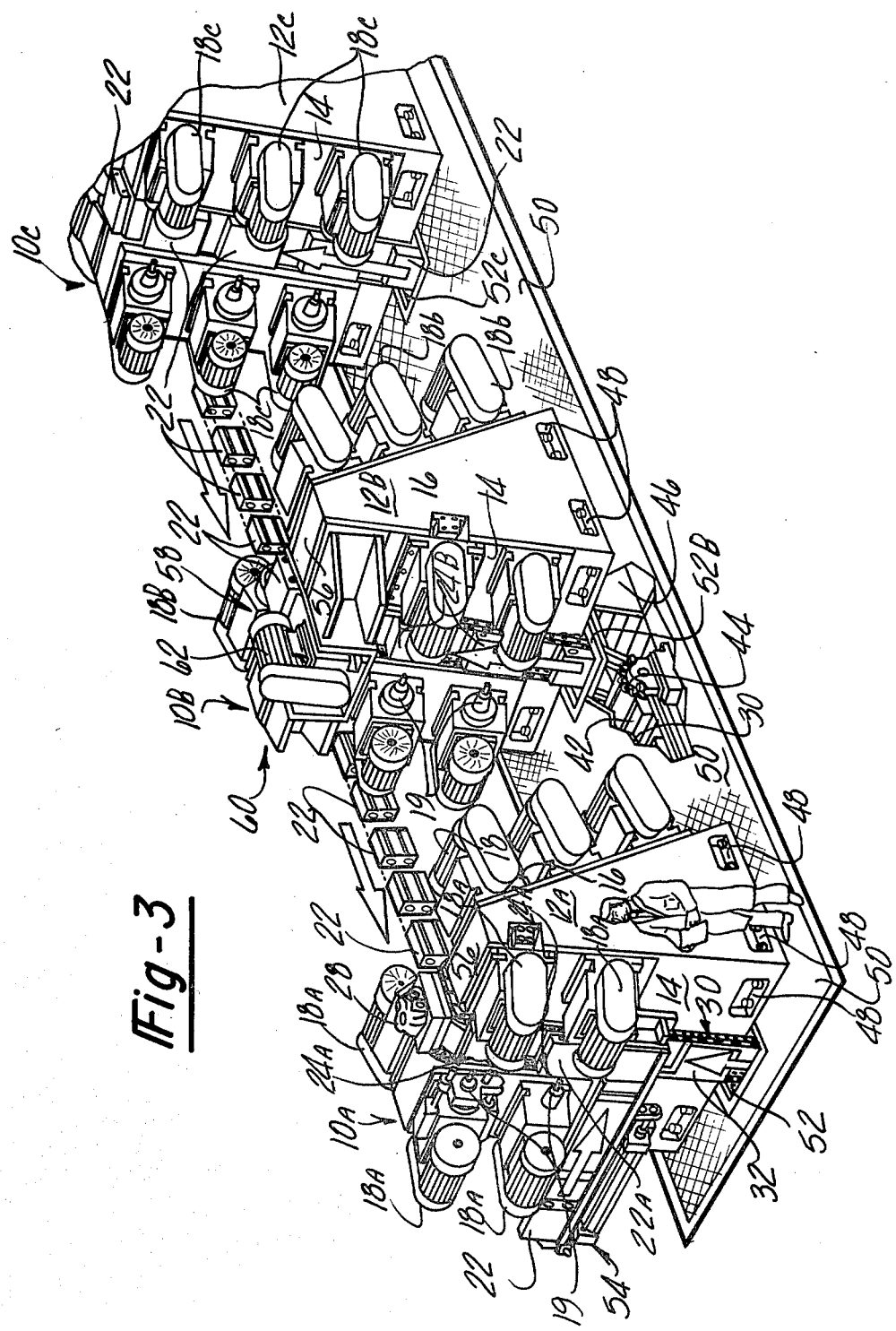
FIG. 3 is a perspective view of a transfer machine constructed according to the present invention partially broken away to depict certain details of the conveyor transfer mechanism.
Figure 4:
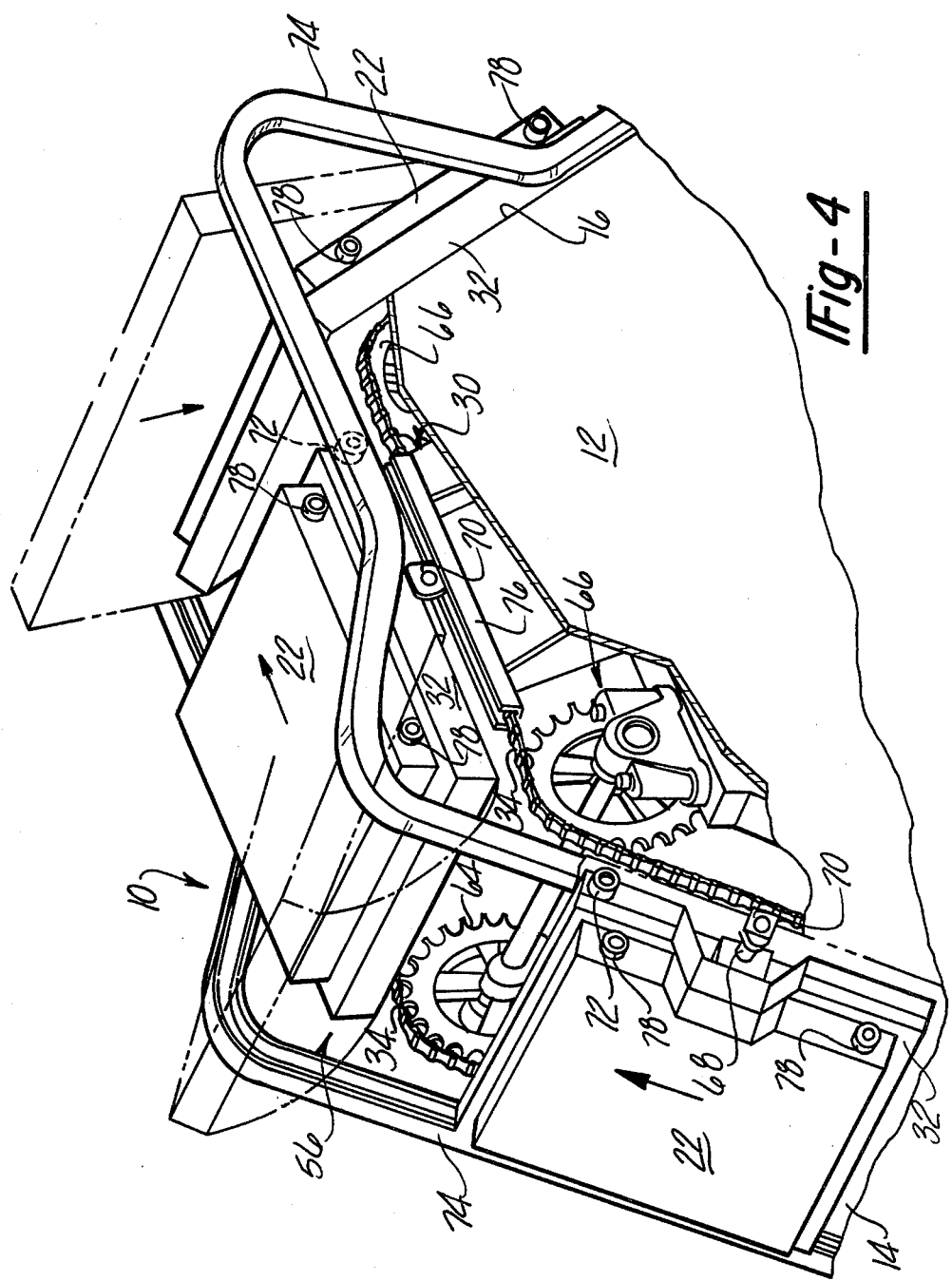
FIG. 4 is an enlarged perspective view of the top portion of one of the machine modules, partially broken away to reveal the details of the transfer system.

Referring to FIGS. 3 and 4, an actual embodiment of a transfer machine according to the present invention is depicted. This machine includes a series of modules 10A, 10B and 10C. Each of the modules 10A, 10B and 10C includes a prismatically-shaped base housing 12 bolted at 48 to the foundation structures 46 extending into the excavated space 42. The excavated space 42 is overlain by a suitable grid 50 to enable foot traffic about the various modules for maintenance functions and access to the tooling 19.

The return section of the conveyor 30 passes up through an opening 52 in the grid 50 to be provided with pallets 22 loaded as by a loader mechanism indicated at 54. The workpieces 28 are installed at the same part load station by suitable conventional loader and power-wrenching mechanisms (not shown). The pallets 22 are loaded before the first work station 24A at the first set of work heads 18A of module 10A.

The workpieces 28 are also loaded at this point, but are not shown in place on the pallets 22 in order to better illustrate the details of the mechanism. It will be understood that under normal operation, there is a workpiece 28 mounted to each pallet 22 in each work station 24.

The conveyor system 30 moves the pallets 22 and attached workpieces 28 through each work station 24 successively passing up one side 14 of the base housing 12 and down the other side 16 of each of the modules 10, passing over top surface 56 of each of the base housings 12.

The conveyor system 30 passes below floor level into the excavated space 42 intermediate each of modules 10A, 10B and 10C, and re-emerges through grid openings 52B and 52C in the grid 50 at the base of modules 10B and 10C.

Some of the details of a typical conveyor system 30 may be seen in FIG. 4 which shows the conveyor movement over the top surface 56 of each module 10. Conveyor chains 34 each circulate over sprocket wheels 64 mounted in bearing assemblies 66 located adjacent the top surface 56 of base housing 12.

Each of the conveyor plates 32 is driven by means of cross shaft 68 secured in carrier links 70 at intervals along each of conveyor chains 34. The cross shaft 68 in turn is carried by a centrally-located cam roller arrangement (not shown). The conveyor plate 32 is guided in movement around corners through the top surface 56 by means of a front mounted cam roller 72 disposed within a cam guide rail 74 located on either side of conveyor plates 32.

Thus, conveyor plates 32 are guided as they move around the corner by the cam roller 72 and move back into the plane defined by the conveyor chains 34 and then again as each conveyor plate 32 makes the far turn down the opposite side 16 of the base housing 12.

Chain guide tracks 76 would also be provided along the length of conveyor chains 34 as per conventional practice.

Each pallet 22 is power-wrenched to be secured to a conveyor plate 32.

Side located bushings 78 are provided to each receive a locating pin of the locating and clamping mechanisms for each pallet (not shown).

Workpiece 28 may also be machined in a station 58 located on the top surface 56 by a bridging unit 60 indicated in module 10B. Bridging structure 60 provides a support for a cross head 62 mounted to machine the workpiece 28 along a direction through which workpiece 28 is transported through the machine.

Figure 5:
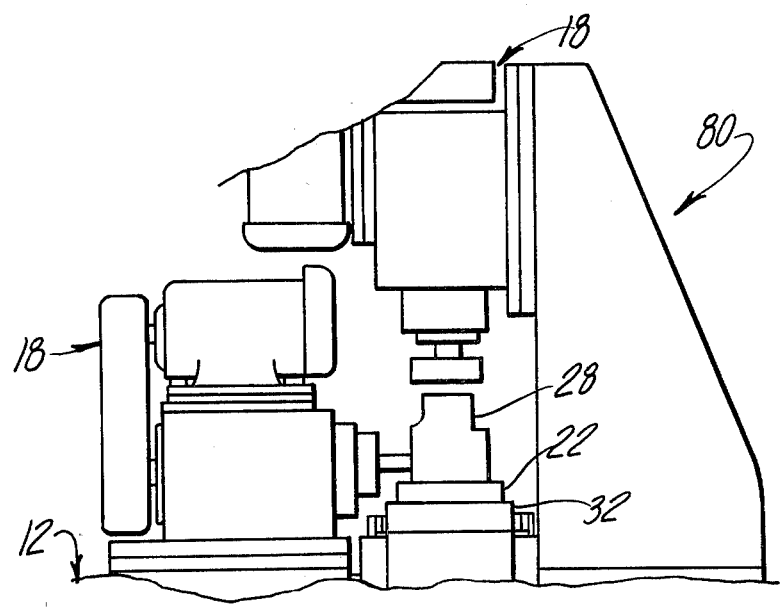
FIG. 5 is a fragmentary end view of one of the machine modules depicting alternate positions of the work head with respect to the work station.

The work heads 18 may also be oriented vertically to extend downwardly into contact with the workpiece 28 by means of an angle bracket 80 secured to the base housing 12, as shown in FIG. 5.

Pallets 22 are returned via a suitable pallet return mechanism as indicated diagrammatically to the loader mechanism 54 after passing through all of work stations 24 and completion of the machining or other operations carried out by the work heads 18 of the transfer machine.

Figure 6:
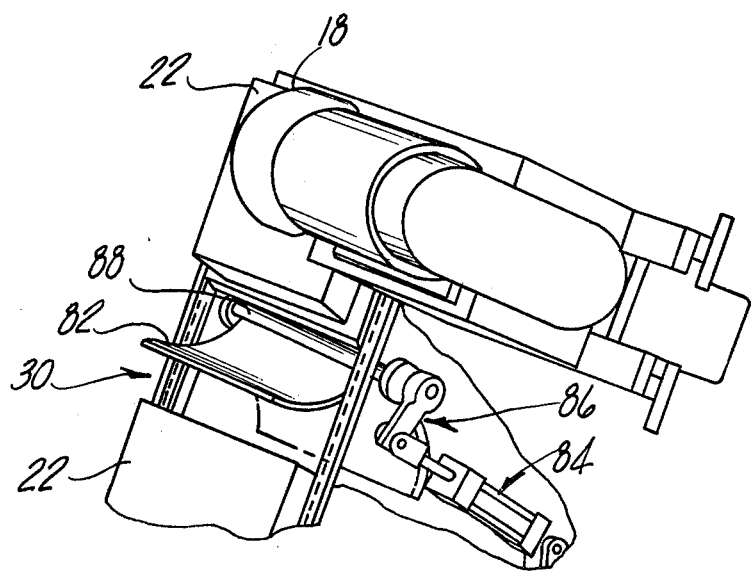
FIG. 6 is a fragmentary view of one of the machine modules depicting a chip handling mechanism for directing the chips away from each machining station.

Referring to FIG. 6, a chip handling arrangement is shown to direct the chips to a chute space beneath the chain conveyor 30 to minimize the chips falling into lower stations in each module.

This arrangement includes a swinging blade 82 adapted to be swung out to a work position so as to intercept the chips as they fall away from the work head 18 located immediately above. During the transfer cycle, the swinging blade 82 is swung inwardly to dump the collected chips into a space below the chain conveyor 30. This movement is achieved by a power cylinder 84 and a suitable linkage 86 as shown in FIG. 6, joined to a pivot shaft 88.

By reference to FIGS. 7 through 10, the saving in floor space over conventional designs can be appreciated.

In FIG. 7, a standard eight station in-line transfer machine is depicted having components of standard sizes. The floor area is 274 inches by 88 inches, equal to 24,112 square inches.

In FIG. 8, a ring transfer having the same number of stations is depicted of 200 inch diameter and occupying a floor area equal to 31,416 square inches.

By comparison, a correspondingly-sized eight station module according to the present invention and measuring 88 inches by 91.25 inches (FIGS. 9 and 10) occupies only 8,030 square inches, a mere fraction of the floor space.

It will be appreciated that many of the details and components ordinarily included in such transfer machines have not been set forth herein, such as the electrical and hydraulic machine controls, hydraulics, lubrication system, coolant supply, the pallet locating and clamping mechanisms, etc. This is because these elements may be of conventional design and are well known to those skilled in the art and a description of the details of the same are not necessary for a proper understanding of the invention.

It is understood that while the module units are depicted in the drawings as trapezoidal prisms in shape, that the degree of slope of the opposite sides 14 and 16 of the base housings 12 may vary from the normal to some lesser degree of slope.

This arrangement produces many advantages over conventional designs. The relatively close spacing of the work heads to each other and their essentially vertically spaced disposition greatly reduces the horizontal floor space required for a given number of stations as demonstrated above.

In addition, this disposition of the stations enables the movement by gravity of the chips away from the stations downward to the base of each module where the chips may easily be removed.

The access to the tooling is rendered more convenient since the worker can approach directly the tooling to service several stations without movement, thus enabling the making of necessary adjustments and tool changes in a rapid and expeditious manner.

The use of common base housings upon which are mounted a number of work heads as well as the conveyor system components reduces the poundage of metal required for the base units and greatly simplifies the disassembly and shipping operations since the entire module may be shipped as a unit.

The disassembly and reassembly of a number of bases or a large number of hydraulic or electrical lines, etc., is also avoided to substantially reduce the labor costs involved.

The components may be essentially of conventional design as the invention does not require the use of new component designs to carry out the invention. The heads, conveyor system, etc., may be of basically conventional design such that the established reliable equipment which has been long in use may be incorporated into the machine.

While the transfer machine depicted in the drawings has been shown as a machine which executes various machining operations on the workpieces, it is to be understood that the concept may also be applied to automatic assembly, test, gaging, or other machines, in which there is automated transfer of workpieces for assembly through successive work stations whereat there are various operations performed on the workpieces and the invention is not limited to those performing machining operations.

Similarly, while a chain conveyor system has been shown, many other transfer systems could of course be employed.

The use of a simple module may also be employed in situations when trunnion or dial machines would be conventionally used, since many of these advantages may also be realized over such machines.

The embodiments of the invention in which an exclusive property or privilege is claimed are defined as follows:

1. A transfer machine comprising:
   at least one machine module, said module including a base housing having a pair of upwardly extending opposite sides;
   a plurality of work heads comprising individually movable slides carrying drive motor spindles and tooling driven thereby mounted on the surface of each of said housing sides, each of said plurality of work heads being spaced apart up and down on said base housing opposite sides and being oriented on either side of a central region of each of said base housing sides, each of said work heads tooling disposed to perform operations on workpieces disposed in said central region;
   transfer means for successively transferring workpieces through each of said central regions of said at least one module base housings into work stations located opposite said work head tooling.

2. The transfer machine according to claim 1 wherein said base housings are prismatically shaped.

3. The transfer machine according to claim 2 wherein said prismatically shaped base housings consist of trapezoidal in section housings, wherein said sloping sides of said trapezoid comprise said upwardly extending opposite sides.

4. The transfer machine according to claim 1 wherein said transfer machine includes a plurality of said modules mounted in alignment in a series with each other and wherein said transfer means further includes means for transferring workpieces through the central region of each of said modules in said series.

5. The transfer machine according to claim 4 wherein said transfer means comprises a conveyor means moving said workpieces through said central regions and wherein said conveyor system includes a return portion thereof passing beneath each of said machine modules from a part load station back to a part unload station in said transfer machine.

6. The transfer machine according to claim 4 wherein said transfer means includes means for moving said workpieces intermediate said successive modules in said series through a space extending below floor level and further including a floor covering extending over said space, whereby said intermediate space is clear of traffic for access to said machining heads located on said adjacent sides of successive modular machine units.

* * * * *